US012121928B2

(12) United States Patent
Marrinan et al.

(10) Patent No.: US 12,121,928 B2
(45) Date of Patent: Oct. 22, 2024

(54) ADJUSTABLE FLUID NOZZLE AND APPARATUS INCLUDING SAME

(71) Applicant: 3M INNOVATIVE PROPERTIES COMPANY, St. Paul, MN (US)

(72) Inventors: Ryan P. Marrinan, Lino Lakes, MN (US); Scott D. Gullicks, River Falls, WI (US); Hyunwoo Jin, Yongin-si (KR); Ki-Sun Shin, Suwon-si (KR)

(73) Assignee: 3M Innovative Properties Company, St. Paul, MN (US)

( * ) Notice: Subject to any disclaimer, the term of this patent is extended or adjusted under 35 U.S.C. 154(b) by 123 days.

(21) Appl. No.: 17/787,241

(22) PCT Filed: Dec. 11, 2020

(86) PCT No.: PCT/IB2020/061820
§ 371 (c)(1),
(2) Date: Jun. 17, 2022

(87) PCT Pub. No.: WO2021/124045
PCT Pub. Date: Jun. 24, 2021

(65) Prior Publication Data

US 2023/0021542 A1 Jan. 26, 2023

Related U.S. Application Data

(60) Provisional application No. 62/951,416, filed on Dec. 20, 2019.

(51) Int. Cl.
*B05C 17/005* (2006.01)

(52) U.S. Cl.
CPC .. *B05C 17/00516* (2013.01); *B05C 17/00553* (2013.01)

(58) Field of Classification Search
CPC ........ B05C 17/00503; B05C 17/00516; B65D 47/263; E04F 21/02; E04F 21/023
(Continued)

(56) References Cited

U.S. PATENT DOCUMENTS 2,172,193 A * 9/1939 Downs .................. B05B 7/0475 239/416.4
2,665,826 A 1/1954 Mahoney
(Continued)

FOREIGN PATENT DOCUMENTS

AU 2005282057 B2 2/2011
CA 2619222 A1 3/2006
(Continued)

OTHER PUBLICATIONS

International Search Report for PCT Application No. PCT/IB2020/061820, mailed on Mar. 29, 2021, 5 pages.
(Continued)

*Primary Examiner* — David P Angwin
*Assistant Examiner* — Bradley S Oliver

(57) ABSTRACT

Various embodiments of a fluid nozzle are disclosed. The nozzle includes a tube having a fluid passageway that extends between an aperture disposed in a first end of the tube and an inlet disposed in a second end of the tube, and a notch disposed in a sidewall of the tube. The notch defines a shield portion of the sidewall of the tube. The fluid nozzle further includes a cap rotatably connected to the tube and disposed over the aperture and the notch of the tube. When the nozzle is in a first orientation the cap is rotated relative to the tube such that an outlet of the cap includes a maximum open area. When the nozzle is in a second orientation the shield portion of the tube occludes a portion of the outlet of the cap such that the outlet includes a minimum open area.

21 Claims, 7 Drawing Sheets

(58) Field of Classification Search
USPC ........................... 222/548; 239/597; 401/263
See application file for complete search history.

(56) References Cited

U.S. PATENT DOCUMENTS

| | | | | |
|---|---|---|---|---|
| 4,546,906 | A | 10/1985 | Vadnais | |
| 4,767,026 | A * | 8/1988 | Keller | B65D 81/325 222/137 |
| 5,419,467 | A * | 5/1995 | Maguire | B65D 47/06 222/548 |
| 5,624,260 | A | 4/1997 | Wilcox et al. | |
| 6,299,034 | B1 | 10/2001 | Tancheff | |
| 6,974,090 | B2 | 12/2005 | Brax | |
| 7,445,166 | B2 | 11/2008 | Williams | |
| 7,708,211 | B2 * | 5/2010 | Maier | B05C 17/00516 239/513 |
| 7,931,175 | B2 | 4/2011 | Hjort | |
| D639,903 | S | 6/2011 | Plotzitzka et al. | |
| 10,758,932 | B2 * | 9/2020 | Schnur | B05C 17/00516 |
| 2004/0022696 | A1 | 11/2004 | Lafond | |
| 2007/0016404 | A1 | 7/2007 | Reidt et al. | |
| 2008/0024084 | A1 | 10/2008 | Blamer | |
| 2019/0016048 | A1 | 5/2019 | Schnur et al. | |

FOREIGN PATENT DOCUMENTS

| | | | |
|---|---|---|---|
| CA | 2619495 | A1 | 9/2008 |
| DE | 102012110818 | A1 | 5/2014 |
| EP | 1791651 | A1 | 6/2007 |
| GB | 2490365 | A | 10/2012 |
| JP | 2008512220 | A | 4/2008 |
| JP | 2008246476 | A | 10/2008 |
| JP | 6353387 | B2 | 7/2018 |
| WO | 2006/026990 | A1 | 3/2006 |
| WO | 2013/030828 | A2 | 3/2013 |

OTHER PUBLICATIONS

Technical Data Sheet, "Heavy-Bodied Seam Sealer 08308", 3M Automotive Aftermarket Division, 3M, St. Paul, MN, 2017, 4 pages.

* cited by examiner

ADJUSTABLE FLUID NOZZLE AND APPARATUS INCLUDING SAME

CROSS REFERENCE TO RELATED APPLICATIONS

This application is a national stage filing under 35 U.S.C. 371 of PCT/IB2020/061820, filed Dec. 11, 2020, which claims the benefit of U.S. Application No. 62/951,416, filed Dec. 20, 2019, the disclosure of which is incorporated by reference in its/their entirety herein.

BACKGROUND

Vehicles such as automobiles typically include multiple external panels that are connected to a frame or chassis. Gaps between these panels can be filled with a seam sealer to prevent moisture, dirt, etc. from passing through the gaps and into the engine or passenger compartments of the vehicle. Such sealers can also provide sound damping to the vehicle. When one or more of these panels need to be replaced, the gaps between such panels are resealed by a technician. Oftentimes, seam seals have a unique look or pattern that is associated with the original manufacturer of the vehicle. When replacing these seam seals, the technician may desire to replicate the look or pattern of the original seam seals.

SUMMARY

In general, the present disclosure provides various embodiments of a fluid nozzle and an apparatus that includes such nozzle. The nozzle can include a tube and a cap disposed over an aperture formed in an end of the tube. The cap includes an outlet disposed adjacent the aperture of the tube. The cap and tube are adapted to rotate relative to each other such that an open area of the outlet can be selectively occluded to provide a desired width or other physical characteristics of a fluid being ejected from a fluid passageway of the tube through the outlet of the cap.

In one aspect, the present disclosure provides a fluid nozzle that includes a tube that extends along a tube axis between a first end and a second end of the tube. The tube includes a fluid passageway disposed within the tube, where the fluid passageway extends between an aperture disposed in the first end of the tube and an inlet disposed in the second end of the tube; and a notch disposed in a sidewall of the tube, where the notch extends from the aperture toward the inlet. The notch defines a shield portion of the sidewall of the tube. The fluid nozzle further includes a cap disposed over the aperture and the notch of the tube and is rotatably connected to the tube. The cap includes a first end, a second end, and an outlet disposed in the first end of the cap adjacent the aperture of the tube, where the outlet extends along a sidewall of the cap from the first end of the cap toward the second end. The nozzle includes a first orientation and a second orientation. When the nozzle is in the first orientation the cap is rotated relative to the tube such that the outlet of the cap includes a maximum open area. When the nozzle is in the second orientation the cap is rotated relative to the tube such that the shield portion of the tube occludes a portion of the outlet of the cap such that the outlet includes a minimum open area.

In another aspect, the present disclosure provides a fluid apparatus that includes a fluid source and a nozzle connected to the fluid source and adapted to dispense a fluid from the fluid source. The nozzle includes a tube that extends along a tube axis between a first end and a second end of the tube. The tube includes a fluid passageway disposed within the tube, where the fluid passageway extends between an aperture disposed in the first end of the tube and an inlet disposed in the second end of the tube. The fluid source is connected to the inlet of the tube. In some aspects, the fluid source includes an outlet, and the inlet of the tube includes at least one thread adapted to receive at least one thread of the outlet of the fluid source. The tube also includes a notch disposed in a sidewall of the tube, where the notch extends from the aperture toward the inlet. The notch defines a shield portion of the sidewall of the tube. The fluid nozzle also includes a cap disposed over the aperture and the notch of the tube and rotatably connected to the tube. The cap includes a first end, a second end, and an outlet disposed in the first end of the cap adjacent the aperture of the tube, where the outlet extends along a sidewall of the cap from the first end of the cap toward the second end. The nozzle includes a first orientation and a second orientation. When the nozzle is in the first orientation the cap is rotated relative to the tube such that the outlet of the cap includes a maximum open area. When the nozzle is in the second orientation the cap is rotated relative to the tube such that the shield portion of the tube occludes a portion of the outlet of the cap such that the outlet includes a minimum open area.

In another aspect, the present disclosure provides a method that includes connecting a nozzle to a fluid source, where the nozzle includes a tube and a cap disposed over an aperture and a notch of the tube, where the cap is rotatably connected to the tube. The cap includes an outlet disposed in a first end of the cap. The method further includes directing a fluid from the fluid source into an inlet of the tube, and rotating the cap of the nozzle relative to the tube between a first orientation and a second orientation of the nozzle. When the nozzle is in the first orientation the cap is rotated relative to the tube such that the outlet of the cap includes a maximum open area. Further, when the nozzle is in the second orientation the cap is rotated relative to the tube such that the shield portion of the tube occludes a portion of the outlet of the cap such that the open area of the outlet includes a minimum open area. The method further includes ejecting the fluid through the open area of the outlet of the cap.

All headings provided herein are for the convenience of the reader and should not be used to limit the meaning of any text that follows the heading, unless so specified.

The terms "comprises" and variations thereof do not have a limiting meaning where these terms appear in the description and claims. Such terms will be understood to imply the inclusion of a stated step or element or group of steps or elements but not the exclusion of any other step or element or group of steps or elements. The term "consisting of" means "including," and is limited to whatever follows the phrase "consisting of." Thus, the phrase "consisting of" indicates that the listed elements are required or mandatory and that no other elements may be present. The term "consisting essentially of" means including any elements listed after the phrase, and is limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The words "preferred" and "preferably" refer to embodiments of the disclosure that may afford certain benefits, under certain circumstances; however, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one."

The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

These and other aspects of the present disclosure will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification, reference is made to the appended drawings, where like reference numerals designate like elements, and wherein.

DETAILED DESCRIPTION

Figure 1:
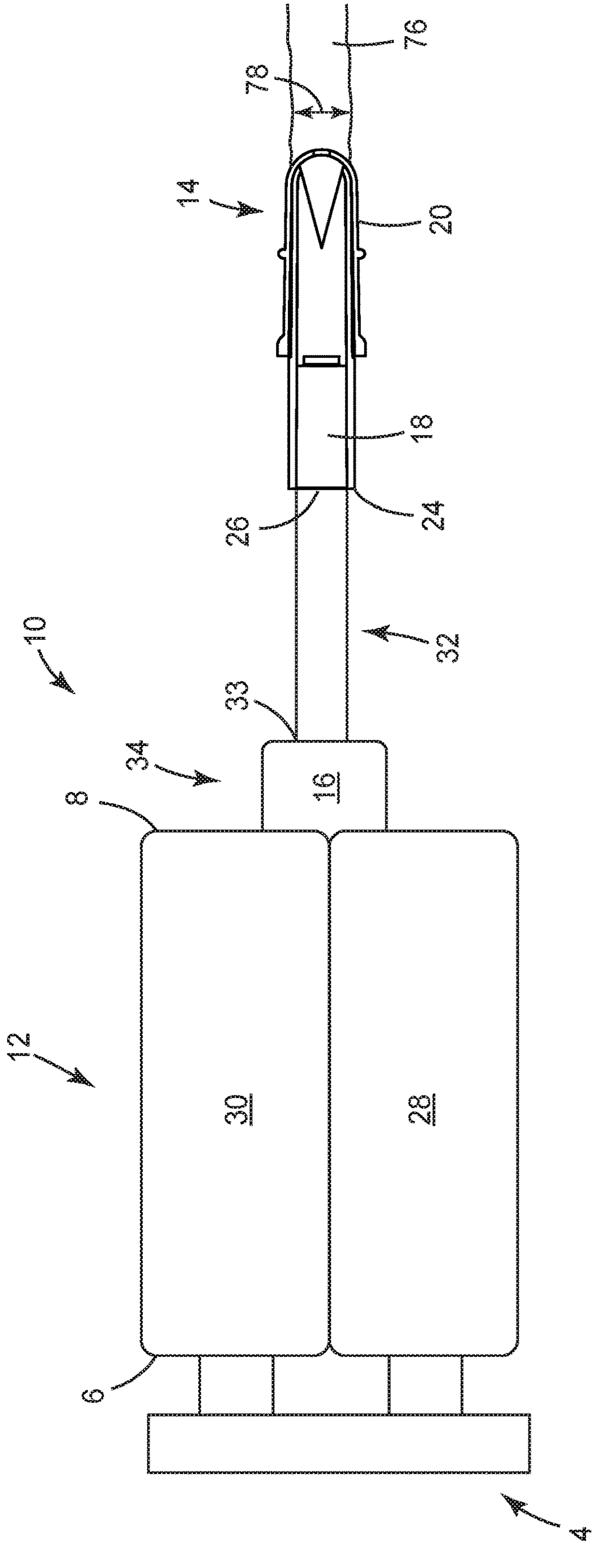
FIG. 1 is a schematic perspective view of one embodiment of a fluid apparatus that includes a nozzle.
Figure 2:
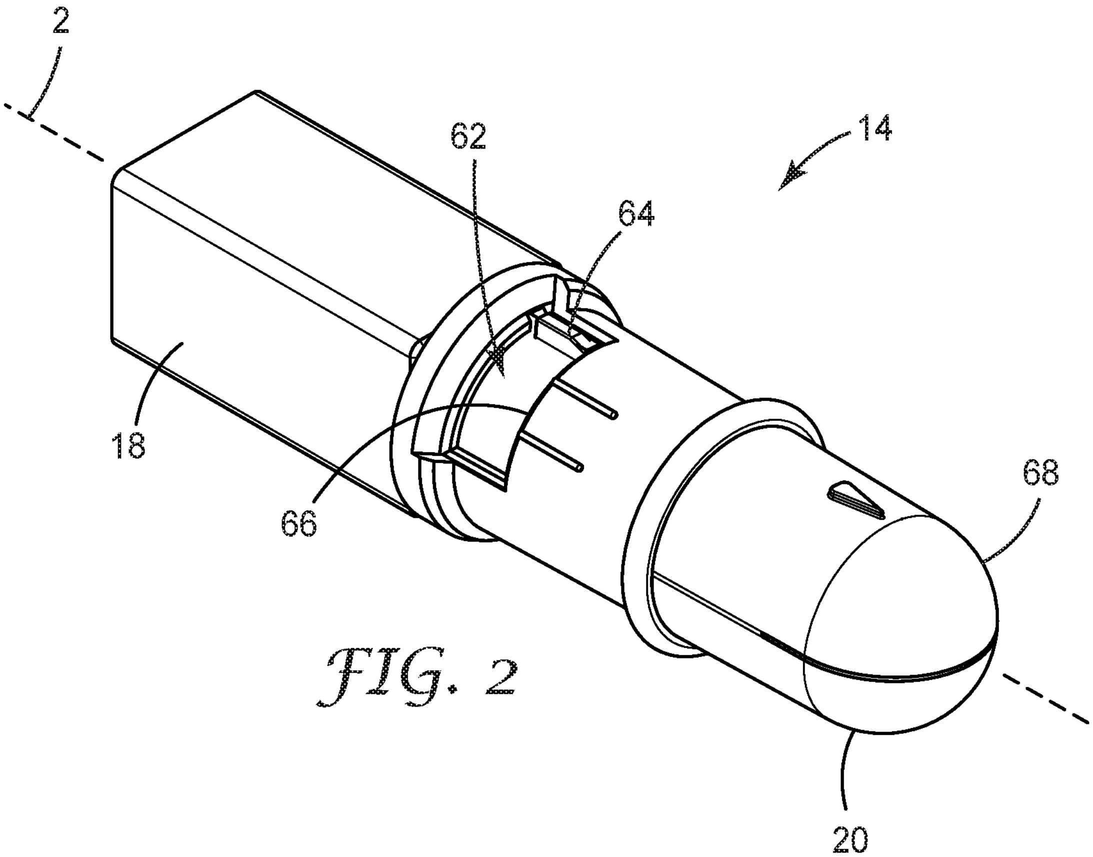
FIG. 2 is a schematic perspective view of the nozzle of FIG. 1.

In general, the present disclosure provides various embodiments of a fluid nozzle and an apparatus that includes such nozzle. The nozzle can include a tube and a cap disposed over an aperture formed in an end of the tube. The cap includes an outlet disposed adjacent the aperture of the tube. The cap and tube are adapted to rotate relative to each other such that an open area of the outlet can be selectively occluded to provide a desired width or other physical characteristics of a fluid being ejected from a fluid passageway of the tube through the outlet of the cap.

Typical OEM seam-sealing techniques require time-consuming manual processes to provide seam seals that resemble original factory-applied seam seals. Such processes include using other hand tools to physically create specific textures and patterns by manually changing the appearance. Further, such processes include the use of combs, modified plastic body filler spreaders, Scotch Brite scuff pads, or other tooling after dispensing sealer onto the surface; physically altering the dispensing through movements of the applicator; adjustment of air pressure using the trigger of a pneumatic applicator; or application of physical pressure of a manual applicator. Other techniques can also include, but are not limited to, cutting or manipulating the dispensing nozzles or selection of various sealing materials being utilized.

One or more embodiments of nozzles described herein can be utilized to vary physical characteristics of fluid ejected from the nozzle. For example, a width of the ejected fluid or a pattern or texture of the ejected fluid can be selected utilizing one or more embodiments of nozzles described herein. The nozzle can include a tube and cap rotatably connected to the tube, wherein the cap can be rotated relative to the tube to selectively control various physical characteristics of the ejected fluid. For example, in one or more embodiments, the nozzle can include one or more orientations provided by rotation of the cap relative to the tube. A first orientation of the nozzle can provide a maximum open area of an outlet of the cap of the nozzle, and a second orientation can provide a minimum open area of the outlet. When in the first orientation, the nozzle can provide a bead of ejected fluid that has a maximum width. As used herein, the term "open area" refers to a region for the dispensing of a fluid. As used herein, the term "maximum open area" and "minimum open area" can be relative to each other. For example, a maximum open area can occur relative to a mostly closed open area.

In some embodiments, the aperture of the nozzle when in the first orientation (i.e., maximum open area) can have a dimension (e.g., a width dimension) that is no greater than 2.54 cm (1 inch). In other embodiments, the aperture of the nozzle when in the first orientation can have a dimension that is no greater than is no greater than 1.4 cm (0.55 inch). As described herein, the dimension can be arcuate or can refer to a diameter of the aperture.

In some embodiments, the aperture of the nozzle when in the second orientation (i.e., minimum open area) can have a dimension that is at least 0.025 centimeter (0.01 inch). In other embodiments, the aperture of the nozzle when in the second orientation can have a dimension that is at least 0.9 cm (0.36 inch). In some embodiments, the aperture of the nozzle can range between the minimum dimension and the maximum dimension (inclusive).

Further, the maximum open area can be defined by the maximum bead width of the ejected fluid when the nozzle is at the first orientation. For example, when the dimension (e.g., aperture width) of the maximum open area no greater than 1.4 cm, the maximum bead width is no greater than 42 millimeters wide (i.e., maximum bead width). Thus, the maximum bead width can be no greater than 30% of the dimension at the first orientation.

Conversely, the minimum open area can be defined by the minimum bead width, that is, the width of bead of ejected fluid when the nozzle is at the second orientation. In some embodiments, when the minimum open area is at least 0.9 cm the minimum bead width is at least 22 millimeters wide (i.e., minimum bead width). Thus, the minimum bead with can be at least 24% of the dimension at the second orientation.

Figure 3:
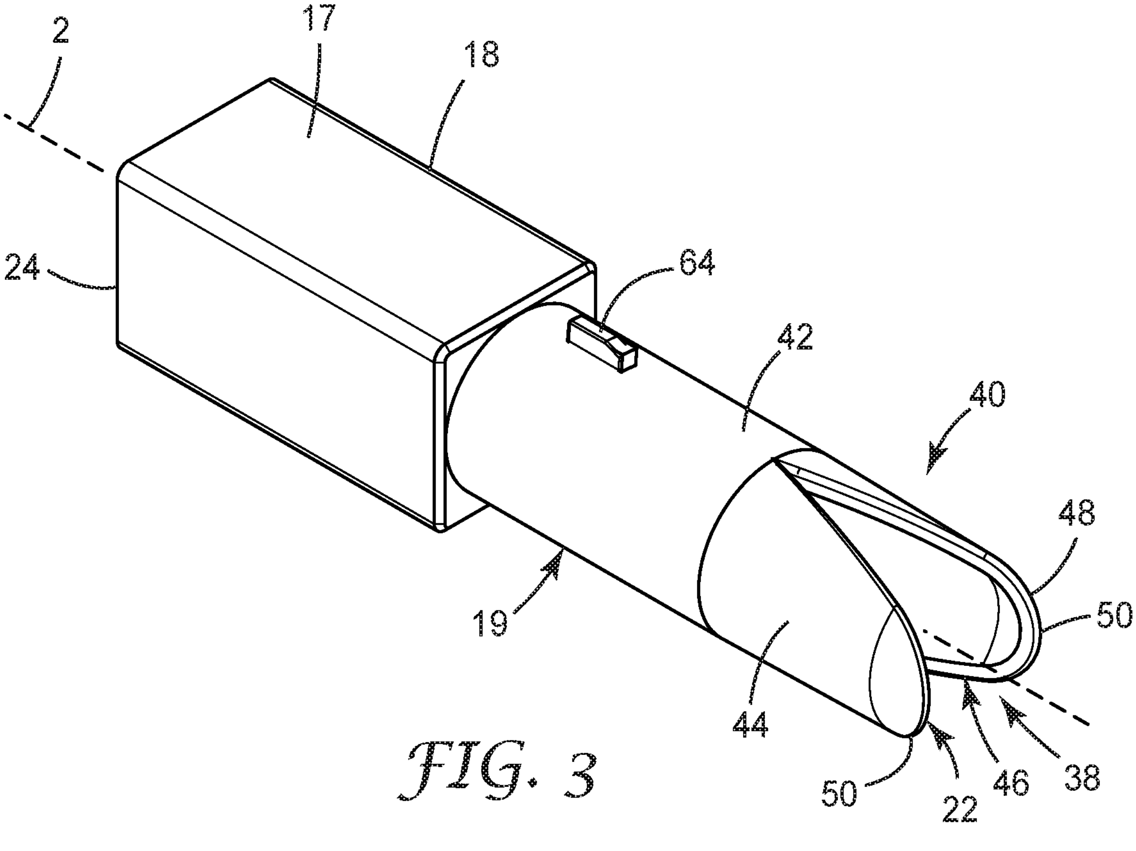
FIG. 3 is a schematic perspective view of a tube of the nozzle of FIG. 1.
Figure 4:
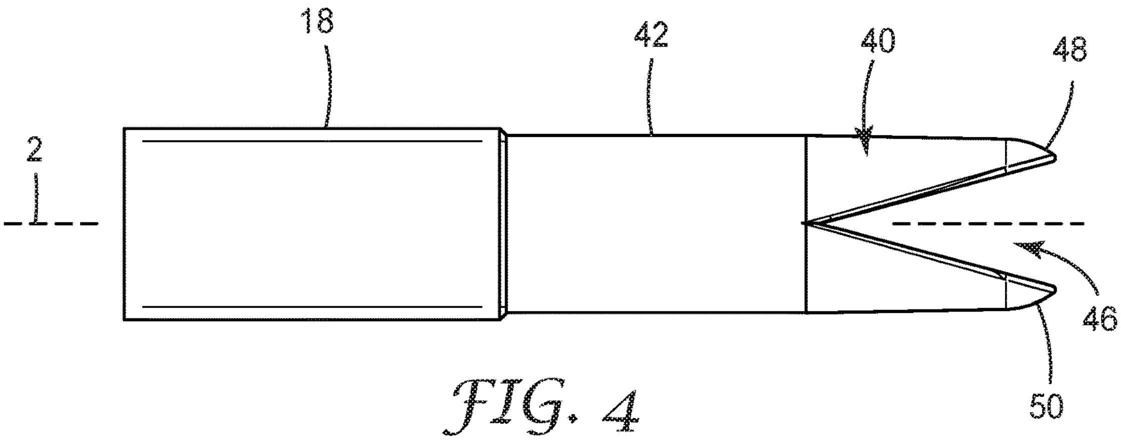
FIG. 4 is a schematic side view of the tube of FIG. 3.
Figure 5:
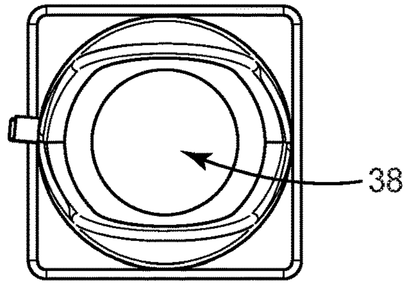
FIG. 5 is a schematic end view of the tube of FIG. 3.

In some embodiments, the maximum open area can be defined by the bead area. For example, the aperture can dispense a bead of fluid having a cross-sectional bead area of no greater than 210 square millimeters at a first orientation of the nozzle. In another example, the aperture can dispense a bead of fluid having a cross-sectional bead area of at least 44 square millimeters at a second orientation of the nozzle FIG. 1 is a schematic perspective view of one embodiment of a fluid apparatus 10. The apparatus 10 includes a fluid source 12 and a nozzle 14 connected to the fluid source and adapted to dispense a fluid 16 from the fluid source. As is further described herein, the nozzle 14 includes a tube 18 and a cap 20 rotatably connected to the tube. The tube 18 can include a first end 22 and a second end 24 (FIG. 3). An inlet 26 is disposed in the second end 24 of the tube 18. The fluid source 12 can be connected to the inlet 26 of tube 18 using any suitable technique or techniques.

The fluid source 12 can include any suitable fluid source or sources. In the embodiment illustrated in FIG. 1, the fluid source 12 includes a housing 13 that extends between a first end 6 and a second end 8. Further, a plunger 4 can be disposed in the second end 6 of the housing 13 that can be utilized to force the fluid 16 through an outlet 34 of the fluid source 12 that is disposed in the second end 8 of the housing 13. In one or more embodiments, the fluid source 12 does not include the plunger 4, and the fluid 16 can be forced through the outlet 34, e.g., by applying pressure, e.g., by squeezing the housing 13.

The fluid source 12 includes a first chamber 28 and a second chamber 30. The first chamber 28 can include a first component (hereinafter first component 28) of the fluid 16 and the second chamber 30 can include a second component (hereinafter second component 30) of the fluid. In one or more embodiments, the apparatus 10 can also include a mixer 32. The mixer 32 can be adapted to mix the first component from the first chamber 28 with the second component from the second chamber 30 prior to the fluid 16 being directed into the inlet 26 of the tube 18.

The fluid 16 can include any suitable material or materials, e.g., seam sealers, epoxies, foams, adhesives (e.g., one or two-part adhesives), fillers, etc. Any suitable seam sealing materials can be utilized, e.g., one-part and two-part seam sealers, urethane sealers, modified saline polymer sealers, two-part epoxy sealers, one-part and two-part acrylic sealers, viscus one-part and two-part moisture sealants, UV-cure sealants, blue-light-cure sealants, heat activated sealants, etc. Further, any suitable adhesives can be utilized, e.g., one-part and two-part acrylic adhesives, etc. In one or more embodiments, the fluid 16 is a seam sealing composition that is adapted to seal one or more seams disposed between panels of a vehicle or boat, or to seal seams present on interior or exterior surfaces of buildings.

The mixer 32 can include any suitable device or component that is adapted to mix two or more components of the fluid 16 prior to the fluid being directed into the inlet 26 of the tube 18 of the nozzle 12. In one or more embodiments, the mixer 32 is a static mixer. Further, in one or more embodiments, the mixer 32 is a dynamic mixer.

The mixer 32 can be connected to the fluid source 12 using any suitable technique or techniques. For example, a first end 33 of the mixer 32 can include one or more threads that are adapted to receive one or more threads of the outlet 34 of the fluid source 12. In one or more embodiments, the mixer can be connected to the fluid source 12 by press-fitting the first end 33 of the mixer into or over the outlet 34 of the fluid source. In one or more embodiments, the mixer 32 can be connected to the fluid source 12 utilizing a quarter-turn locking mechanism that is connected to the first end of the mixer and the outlet 34 of the fluid source. In some embodiments, the fluid source 12 can include an outlet 34, and the nozzle 14 is connected to the outlet 34 of the fluid source 12 through at least one of a press-fit mechanism or a quarter-turn locking mechanism. Further, the mixer 32 can be connected to the nozzle 14 using any suitable technique or techniques. In one or more embodiments, the nozzle 14 and the mixer 32 can be integral, i.e., manufactured as a single part. For example, the mixer 32 and the tube 18 of the nozzle 14 can be integral, and the cap 20 of the nozzle can be disposed over the tube as is further described herein. Further, any suitable technique or techniques can be utilized to connect the nozzle 14 to the mixer 32, e.g., the same techniques described herein regarding connection of the mixer to the fluid source 12.

In one or more embodiments, the nozzle 14 can be directly connected to the fluid source 12 using any suitable technique or techniques such that the mixer 32 is not disposed between the outlet 34 of the fluid source and the nozzle. For example, the inlet 26 of the tube 18 can include one or more threads that are adapted to receive one or more threads of the outlet 34 of the fluid source 12. In one or more embodiments, the nozzle 14 can be connected to the fluid source 12 by press-fitting the nozzle onto the outlet 34 of the fluid source. In one or more embodiments, the nozzle 14 can be connected to the fluid source 12 utilizing a quarter-turn locking mechanism that is connected to the tube 18 of the nozzle and the outlet 34 of the fluid source.

The apparatus 10 can be included in a kit that also includes one or more nozzles 14. Each nozzle 14 of the kit can be adapted to provide varying physical characteristics of fluid ejected from the nozzle. For example, the kit can include a first nozzle that can be adapted to provide a first bead width 78 of a bead 76 of fluid 16 formed by the nozzle, a second nozzle that can be adapted to provide a second bead width, and a third nozzle that can be adapted to provide a third bead width. Such kit can include any suitable number of nozzles 14 that provide any suitable characteristics of ejected fluid 16. In one or more embodiments, the kit can include two or more nozzles that provide the same characteristics of ejected fluid 16.

FIGS. 2-10 are various views of the nozzle 14 of apparatus 10 of FIG. 1. Although described in regard to fluid apparatus 10 of FIG. 1, the nozzle 14 can be utilized with any suitable fluid apparatus. The nozzle 14 can include the tube 18, which extends along a tube axis 2 between the first end 22 and the second end 24. The tube 18 includes a fluid passageway 36 (FIG. 9) disposed within the tube and extending between an aperture 38 (FIG. 3) disposed in the first end 22 of the tube and the inlet 26 disposed in the second end 24 of the tube. The tube 18 further includes one or more notches 40 disposed in a sidewall 42 of the tube. The notch 40 extends from the aperture 38 toward the inlet 26. The notch 40 can define a shield portion 44 of the sidewall 42 of the tube 18.

The tube 18 can take any suitable shape or shapes and have any suitable dimensions. In one or more embodiments, the tube 18 can take a cylindrical shape. In one or more embodiments, the tube 18 can have a first portion 17 that takes a first shape and a second portion 19 that takes a second shape. Further, the tube 18 can have any suitable length as measured between the first and second ends 22, 24 of the tube along the tube axis 2.

The fluid passageway 36 disposed within the tube 18 can also take any suitable shape or shapes and have any suitable dimensions. In or more embodiments, the fluid passageway 36 can have an elliptical cross-section in a plane orthogonal to the tube axis 2. Further, in one or more embodiments, the fluid passageway 36 can have a constant cross-sectional area as measured in a plane orthogonal to the tube axis 2. In one or more embodiments, the fluid passageway 36 can have a varying cross-sectional area in the plane orthogonal to the tube axis 2.

The tube 18 can include any suitable material or materials, e.g., at least one of polymeric (e.g., injection molded plastics), metallic, natural, or ceramic materials. Further, the tube 18 can be manufactured utilizing any suitable technique or techniques, e.g., molding, 3D printing, forging, die casting, machining, stamping, vacuum forming, extrusion, etc.

The tube 18 can include any suitable number of notches 40. In the embodiment illustrated in FIGS. 2-10, the tube 18 includes notch 40 and a second notch 46 also disposed in the sidewall 42 of the tube. The second notch 46 extends from the aperture 38 toward the inlet 26. Further, the notch 40 and the second notch 46 define the shield portion 44 and a second shield portion 48 of the sidewall 42 of the tube 18.

Each of the notch 40 and the second notch 46 can take any suitable shape or shapes. In the embodiment illustrated in FIGS. 1-10, each of the notches 40, 46 can take a V shape. In one or more embodiments, at least one of the notches 40, 46 can take a U shape. Further, in one or more embodiments, at least one of the notches 40, 46 can take a rectilinear shape. The notch 40 and the second notch 46 can take the same shape or different shapes. The notches 40, 46 can be shaped such that the first end 22 of the tube 18 takes any suitable shape or shapes. For example, as shown in FIG. 3, the first end 22 includes rounded portions 50 disposed between the notches 40, 46.

The notches 40, 46 can be disposed in any suitable portion or portions of the sidewall 42 of the tube 18. For example, the notch 40 and the second notch 46 can be disposed on opposite sides of the tube 18 about the tube axis 2, i.e., the tube axis extends between the notch and second notch as viewed in the plane orthogonal to the tube axis.

Disposed over the aperture 38, the notch 40, and second notch 46 of the tube 18 is the cap 20. The cap 20 can be disposed over any suitable portion of the tube 18. Further, the cap 20 can be connected to the tube 18 in any suitable manner. In one or more embodiments, the cap 20 is rotatably connected to the tube 18. In one or more embodiments, the cap 20 is rotatably connected to the tube 18 such that the cap is adapted to rotate about the tube axis 2.

Figure 6:
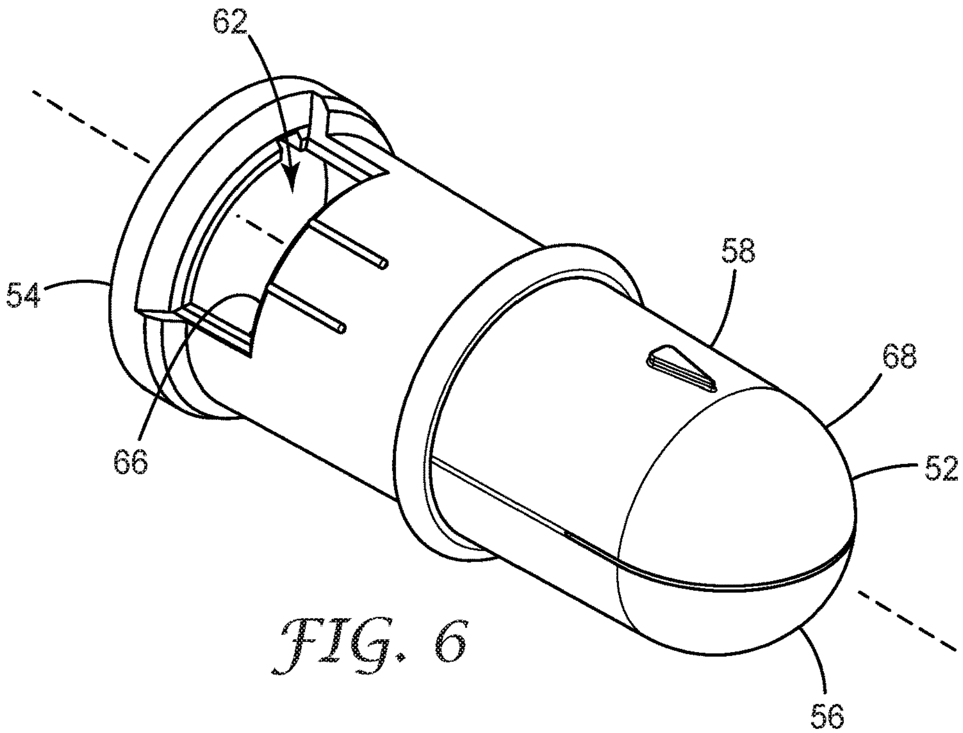
FIG. 6 is a schematic perspective view of a cap of the nozzle of FIG. 1.
Figure 7:
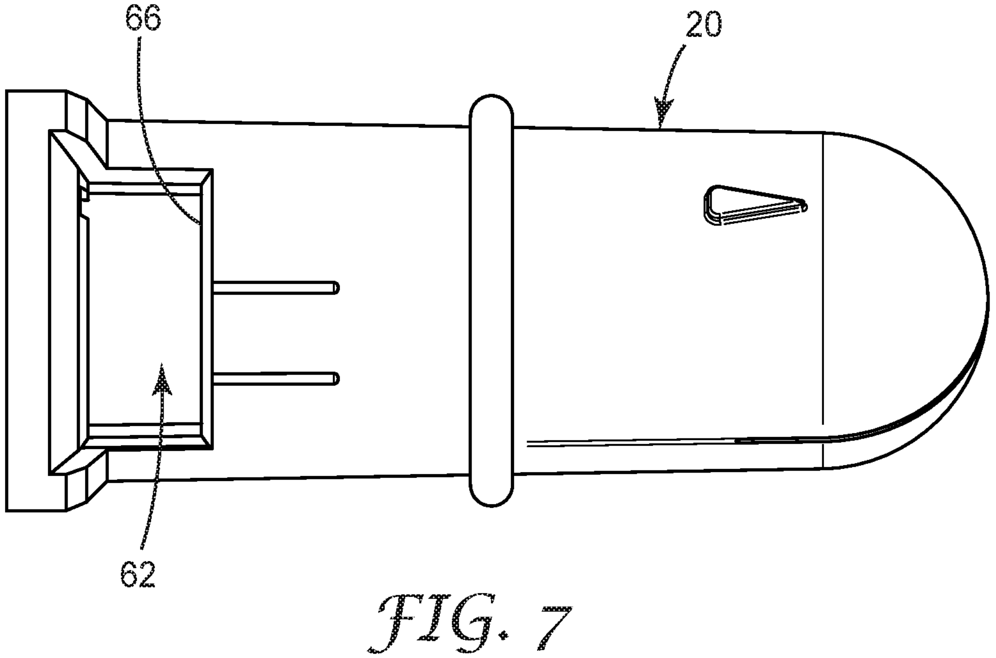
FIG. 7 is a schematic side view of the cap of FIG. 6.

As shown in FIG. 6, the cap 20 includes a first end 52, a second end 54, and an outlet 56 disposed in the first end of the cap. The cap 20 can be disposed over the tube 18 such that the outlet 56 is adjacent the aperture 38 of the tube. The outlet 56 can extend along a sidewall 58 of the cap 20 from the first end 52 of the cap toward the second end 54.

The cap 20 can take any suitable shape or shapes and have any suitable dimensions. In one or more embodiments, an inner surface 60 of the cap 20 (FIG. 10) can take a shape that is substantially similar to one or more portions of the sidewall 42 of the tube 18 such that the sidewall can be received by the cap and the cap can rotate relative to the tube. In one or more embodiments, the inner surface 60 of the cap 20 includes an elliptical cross section in the plane substantially orthogonal to the tube axis 2. Further, the cap 20 can have any suitable length as measured between the first end 52 and the second end 54 of the cap along the tube axis 2 when the cap is disposed over the tube 18.

The cap 20 can include any suitable material or materials, e.g., the same materials described herein regarding the tube 18. In one or more embodiments, the cap 20 can include the same material or materials as the tube 18. Further, in one or more embodiments, the cap 20 can include one or more materials that are different from one or more materials of the tube 18. In addition, the cap 20 can be manufactured utilizing any suitable technique or techniques, e.g., the same techniques described herein regarding the tube 18.

As mentioned herein, the cap 20 can be retained on the tube 18 using any suitable technique or techniques. In one or more embodiments, the cap 20 can include one or more tabs or slots that are adapted to mate with one or more tabs or slots of the tube 18. For example, the tube 18 can include a tab 64 (FIGS. 2-3) disposed on the sidewall 42 of the tube, and the cap 20 can include a slot 62 (FIGS. 2 and 6) that is disposed in the sidewall 58 of the cap and that is adapted to receive the tab of the tube. The tab 64 is adapted to engage a sidewall 66 of the slot 62 of the cap 20 to retain the cap over the tube 18. Further, in one or more embodiments, the tab 64 is also adapted to engage the sidewall 66 of the slot 62 to control rotation of the cap relative to the tube.

The outlet 56 of the cap 20 can be adapted to eject the fluid 16 from the fluid passageway 36 of the tube 18 using any suitable technique or techniques. Further, the outlet 56 can take any suitable shape or shapes and have any suitable dimensions. In one or more embodiments, the outlet 56 can take a shape that provides one or more physical characteristics of the fluid 16 that is ejected through the outlet. For example, in one or more embodiments, the outlet 56 can include one or more grooves or protrusions disposed in or on one or more sidewalls 57 (FIG. 8) of the outlet that can shape the fluid 16 that is ejected through the outlet.

Figure 8:
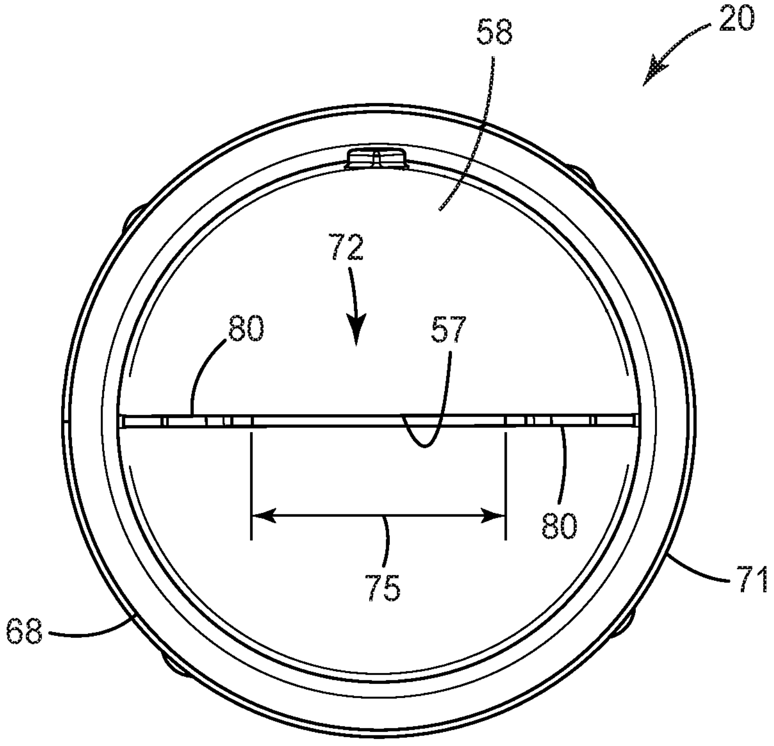
FIG. 8 is a schematic front view of the cap of FIG. 6.
Figure 9:
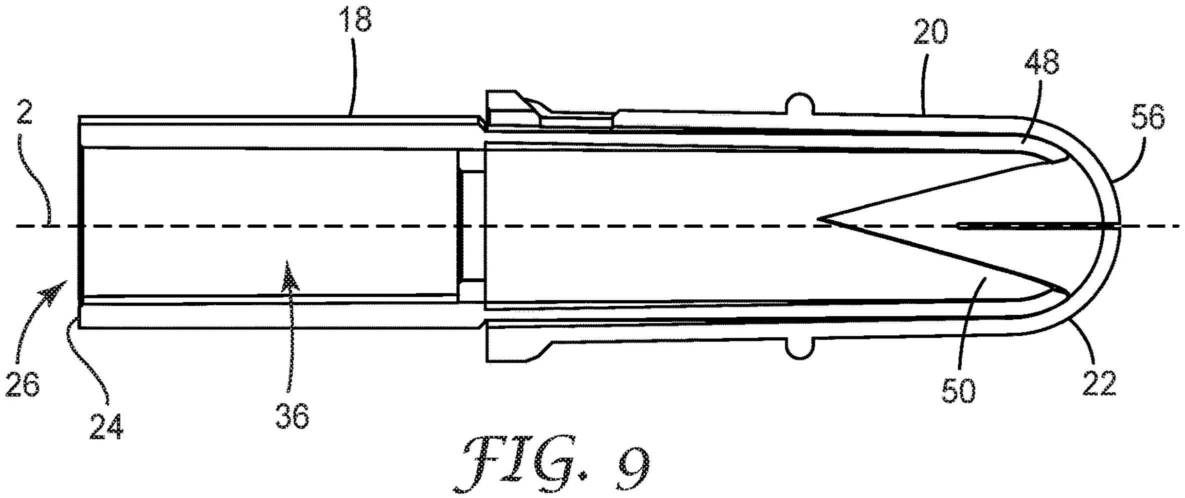
FIG. 9 is a schematic cross-section view of the nozzle of FIG. 1 with the nozzle in a first orientation.

In one or more embodiments, the outlet 56 can include a length measured along an outer surface 68 of the cap 20 of at least 0.50 mm and no greater than 50 mm. Further, the outlet 56 can extend from the first end 52 of the cap 20 and along a first portion 70 and a second portion 71 (FIG. 8) of the sidewall 58 of the cap in a direction parallel to the tube axis 2. In one or more embodiments, the outlet 56 can extend from a center 72 of the first end 52 of the cap 20 along the outer surface 68 toward the second end 54 such that the outlet is symmetrical about the tube axis 2 as shown in FIG. 8.

The outlet 56 can include an open area 75 (FIG. 8) through which the fluid 16 from the fluid source 12 can be ejected. In one or more embodiments, the ejected fluid 16 can form a bead 76 (FIG. 1) that has a selected bead width as measured immediately upon ejection of the fluid from the outlet 56. The bead width 78 can be controlled by rotation of the cap 20 relative to the tube 18. In one or more embodiments, the cap 20 can be rotated while the tube 18 remains fixed. Further, in one or more embodiments, the tube 18 can be rotated relative to the cap 20.

Figure 10:
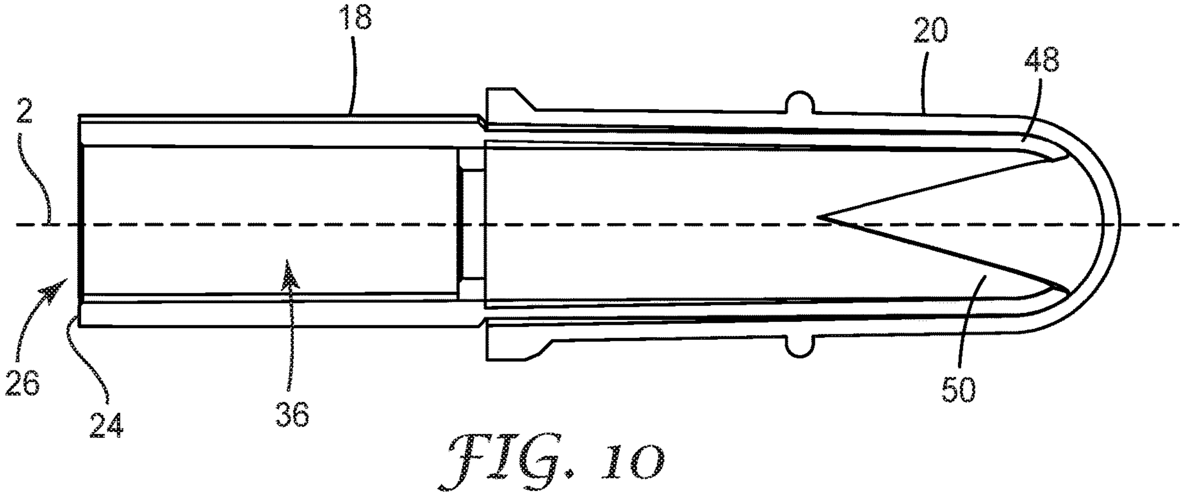
FIG. 10 is a schematic cross-section view of the nozzle of FIG. 1 with the nozzle in a second orientation.

The nozzle 14 can include a first orientation (FIG. 9) and a second orientation (FIG. 10). When the nozzle 14 is in the first orientation the cap 20 is rotated relative to the tube 18 such that the outlet 56 of the cap includes a maximum open area, thereby providing a maximum bead width 78 of the bead 76. Further, when the nozzle 14 is in the second orientation the cap 20 is rotated relative to the tube 18 such that at least one of the shield portion 44 or the second shield portion 48 of the tube occludes a portion 80 (FIG. 8) of the outlet 56 of the cap. In the second orientation, the outlet includes a minimum open area, thereby providing a minimum bead width 78 of the bead 76. In one or more embodiments, each of the shield portion 44 and second shield portion 48 occludes the portion 80 of the outlet 56 of the cap 20.

The open area 75 of the outlet 56 can have any suitable dimensions. In some embodiments, the open area has an aperture diameter ranging from 0.025 cm to 2.54 cm (inclusive). Further, the nozzle 14 can be adapted such that the open area 75 is continuously variable between the minimum open area and the maximum open area. Such continuously-variable open area 75 can provide an infinite number of bead widths 78. For example, in one or more embodiments, the notch 40 can take a shape that is adapted to selectively occlude the outlet 56 such that fluid 16 in the fluid passageway 36 is blocked from being ejected through the outlet by controlling the open area 75 of the outlet. The V shaped notch 40 of FIGS. 1-10 can define the shield portion 44 that occludes the outlet 56 to provide a continuously-variable open area. Further, in embodiments where the tube 18 includes the second notch 46, such notch can also define the second shield 48 that occludes the outlet 56 to further provide a continuously-variable open area 75. Further, the nozzle 14 can be adapted to provide one or more discrete open areas 75 between the minimum open area and the maximum open area.

Figure 11:
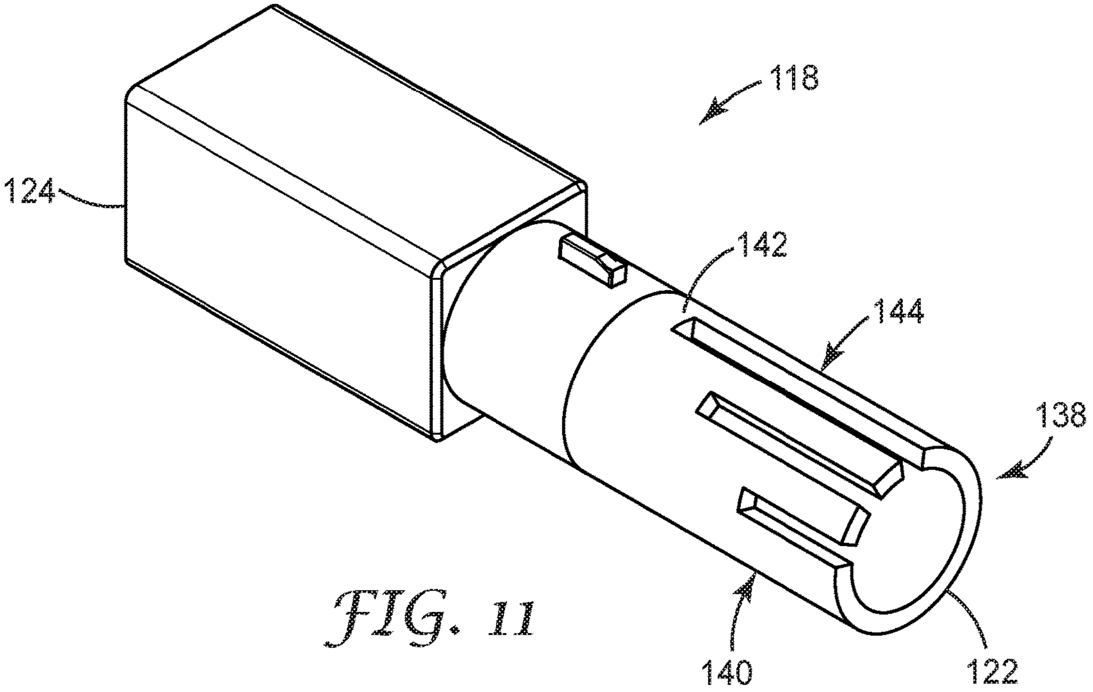
FIG. 11 is a schematic perspective view of another embodiment of a tube of a nozzle.
Figure 12:
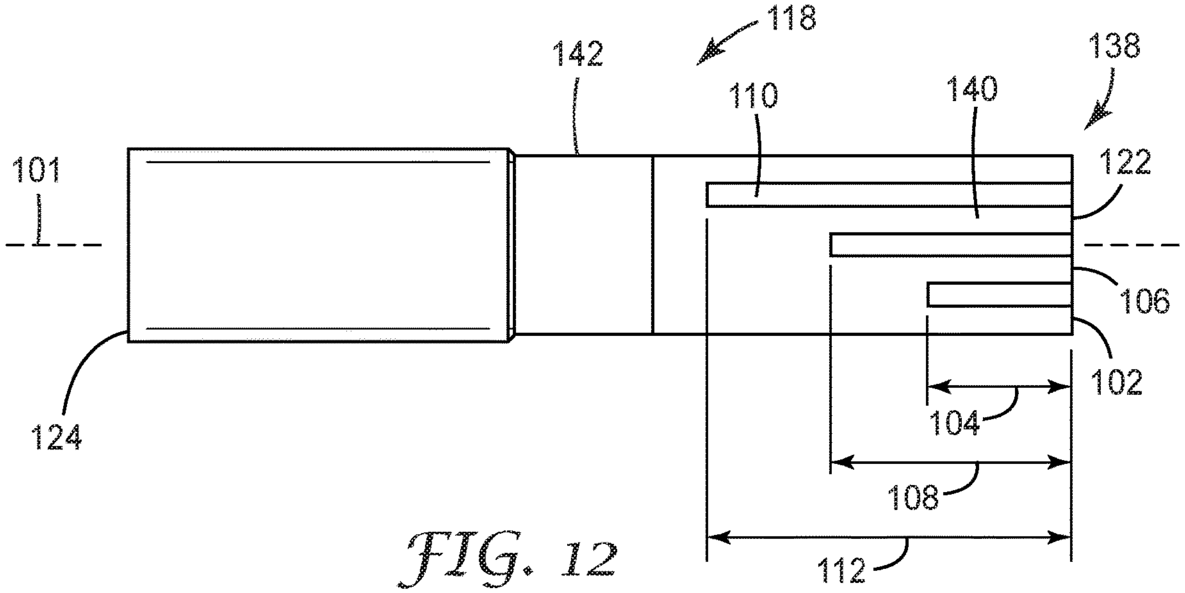
FIG. 12 is a schematic side view of the tube of FIG. 11.

FIGS. 11-12 are perspective and side views respectively of another embodiment of tube 118 that can be utilized with any embodiment of a cap described herein (e.g., cap 20) to form a nozzle (e.g., nozzle 14). All of the design considerations and possibilities described herein regarding the tube 18 of FIGS. 1-10 apply equally to the tube 118 of FIGS. 11-12. The tube 118 can be utilized with any suitable fluid source (e.g., fluid source 12 of FIG. 1) to provide a fluid apparatus such as fluid apparatus 10.

One difference between tube 118 of FIGS. 11-12 and tube 18 of FIGS. 1-10 is that tube 118 includes a plurality notches 140 disposed in a sidewall 142 of the tube 118 that extend from an aperture 138 disposed in a first end 122 of the tube toward an inlet 126 of the tube that is disposed in a second end 124 of the tube, where each notch takes a rectilinear shape. Such rectilinear shapes define shield portions 144 of the sidewall 142 of the tube 118 that provide discrete open areas of an outlet (e.g., outlet 56) of a cap between a minimum open area and a maximum open area. These discrete open areas in turn can provide discrete bead widths (e.g., bead width 78) of a bead (e.g., bead 76) of a fluid as compared to a continuously variable open area for tubes that have non-rectilinear notch shapes such as notches 40, 46 of tube 18 of FIGS. 1-10.

Further, another difference between tube 118 and tube 18 is that the tube 118 include two or more notches that have differing lengths as measured along a tube axis 101. For example, as shown in FIG. 12, a first notch 102 has a first length 104, a second notch 106 has a second length 108, and a third notch 110 has a third length 112. As a result, when the first notch 102 is aligned with, e.g., outlet 56 of cap 20, a first open area of the outlet will be formed to provide a first bead width of the fluid ejected from the nozzle. Further, when the second notch 106 is aligned with the outlet 56, a second open area of the outlet will be formed to provide a second bead width of the ejected fluid. And when the third notch 110 is aligned with the outlet 56, a third open area of the outlet will be formed to provide a third bead width of the ejected fluid.

The tube 118 can include any suitable number of notches 140. In one or more embodiments, each notch 140 will be matched with a notch of the same length disposed in the sidewall 142 such that the tube axis 101 is disposed between the pair of notches, i.e., the pair of notches are symmetrical about the tube axis. For example, the first notch 102 can be paired with an additional notch of equal length 104 disposed in a portion of the sidewall 142 that is symmetrical about the tube axis 101 from the portion of the sidewall within which the first notch is disposed. Such pairing of notches can provide a bead of ejected fluid that is substantially symmetrical about the tube axis 101 upon ejection from the cap.

Figure 13:
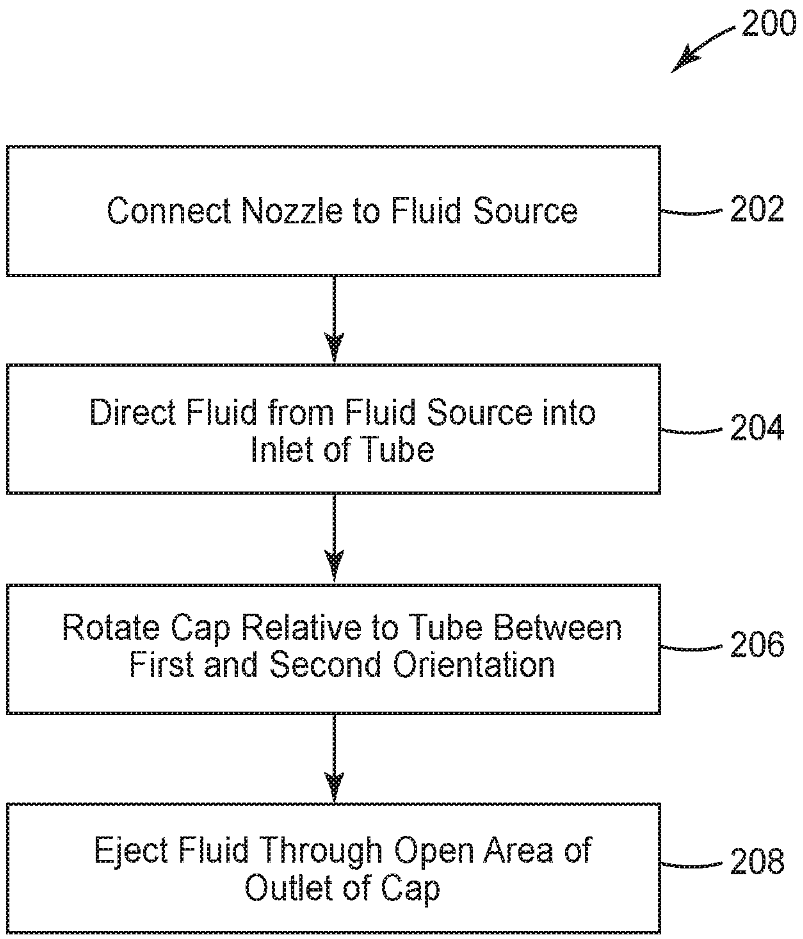
FIG. 13 is a flowchart of a method of utilizing the apparatus of FIG. 1.

Any suitable technique or techniques can be utilized with the various embodiments of apparatuses and nozzles described herein to provide an ejected fluid. For example, FIG. 13 is a flowchart of one embodiment of a method 200 of utilizing apparatus 10 and nozzle 14 of FIGS. 1-10. Although described in regard to apparatus 10 and nozzle 14, the method 200 can be utilized with any suitable apparatus and nozzle.

At 202, the nozzle 14 can be connected to the fluid source 12. In one or more embodiments, the inlet 26 of the nozzle 14 can be connected to the outlet 34 of the fluid source 12 using any suitable technique or techniques, e.g., the inlet can be press-fit onto the outlet of the fluid source. Further, in one or more embodiments, the nozzle 14 can be connected to the mixer 32 that is connected to the outlet 34 of the fluid source 12 using any suitable technique or techniques.

At 204, the fluid 16 from the nozzle 14 can be directed from the fluid source 12 into the inlet 26 of the tube 18 using any suitable technique or techniques. In one or more embodiments, the plunger 4 disposed in the first end 6 of the fluid source 12 can be directed toward the second end 8 of the fluid source to force the fluid 16 through the outlet 34 of the fluid source and into the mixer 32 or directly into the inlet 26 of the nozzle 14 if no mixer is present. In one or more embodiments, the housing 13 of the fluid source 12 can be compressed, e.g., by squeezing the housing, to force the liquid 16 through the outlet 34. Further, in one or more embodiments, the first component 28 of the fluid 16 is mixed with the second component 30 of the fluid prior to the fluid being directed from the fluid source 12 into the inlet 26 of the tube 18. Any suitable technique or techniques can be utilized to mix the first and second components 28, 30. In one or more embodiments, the first and second components 28, 30 can be directed into the mixer 32, and the mixed fluid 16 can then be directed into the inlet 26 of the nozzle 14.

The cap 20 of the nozzle 14 can be rotated relative to the tube 18 between the first orientation and the second orientation of the nozzle at 206. In one or more embodiments, the cap 20 is rotated while the tube remains fixed. In one or more embodiments, the tube 18 is rotated while the cap 20 remains fixed. Further, at 208, the fluid 16 is ejected through the outlet 56 of the cap 20.

All references and publications cited herein are expressly incorporated herein by reference in their entirety into this disclosure, except to the extent they may directly contradict this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the disclosure is to be limited only by the claims provided below.

What is claimed is:

1. A fluid nozzle comprising:

a tube extending along a tube axis between a first end and a second end of the tube, the tube comprising:

a fluid passageway disposed within the tube and extending between an aperture disposed in the first end of the tube and an inlet disposed in the second end of the tube;

a first notch disposed in a sidewall of the tube extending from the aperture toward the inlet, wherein the notch defines a first shield portion of the sidewall of the tube; and a second notch disposed in the sidewall of the tube extending from the aperture toward the inlet, wherein the first notch and the second notch define the first shield portion and a second shield portion of the sidewall of the tube;

wherein the first notch and the second notch are disposed on opposite sides of the tube, wherein the first shield portion has mirror symmetry with the second shield portion across a plane formed between the first notch and the second notch along the tube axis; and a cap disposed over the aperture and the notch of the tube and rotatably connected to the tube, wherein the cap comprises a first end, a second end, and an outlet disposed in the first end of the cap adjacent the aperture of the tube and extending along a sidewall of the cap from the first end of the cap toward the second end;

wherein the nozzle comprises a first orientation and a second orientation, wherein when the nozzle is in the first orientation the cap is rotated relative to the tube such that the outlet of the cap comprises a maximum open area, and wherein when the nozzle is in the second orientation the cap is rotated relative to the tube such that the first shield portion of the tube occludes a portion of the outlet of the cap such that the outlet comprises a minimum open area.

2. The nozzle of claim 1, wherein the open area of the outlet is adapted to eject a fluid from the fluid passageway of the tube, wherein the outlet is symmetrical about the tube axis.

3. The nozzle of claim 1, wherein the cap is adapted to rotate about the tube axis.

4. The nozzle of claim 3, wherein the second end of the tube is adapted to be removably connected to a mixer, and fluid is configured to be dispensed at the first end, the second end and the first end are aligned with the tube axis.

5. The nozzle of claim 1, wherein when the nozzle is in the second orientation the cap is rotated relative to the tube such that the first shield portion and the second shield portion of the tube occlude the portion of the outlet of the cap such that the outlet comprises the minimum open area.

6. The nozzle of claim 5, wherein at least one of the first notch or the second notch comprises a V shape.

7. The nozzle of claim 5, wherein at least one of the first notch or the second notch comprises a U shape.

8. The nozzle of claim 5, wherein the first notch and second notch are symmetrical about the tube axis.

9. The nozzle of claim 1, wherein the outlet of the cap comprises a length measured along an outer surface of the cap of at least 0.5 mm and no greater than 50 mm.

10. The nozzle of claim 1, wherein the tube further comprises a tab disposed on the sidewall of the tube and the cap further comprises a slot disposed in the sidewall of the cap that is adapted to receive the tab of the tube, wherein the tab is adapted to engage a sidewall of the slot of the cap to control rotation of the cap relative to the tube.

11. The nozzle of claim 1, wherein the outlet of the cap extends from the first end of the cap and along first and second portions of the sidewall of the cap toward the second end of the tube, wherein the outlet of the cap is arcuate with the cap.

12. The nozzle of claim 1, wherein the tube further comprises an elliptical cross section in a plane substantially orthogonal to the tube axis.

13. The nozzle of claim 1, wherein an inner surface of the cap comprises an elliptical cross section in a plane substantially orthogonal to the tube axis.

14. The nozzle of claim 1, wherein an open area of the outlet is continuously variable between the minimum open area and the maximum open area.

15. A fluid apparatus comprising a fluid source and the nozzle of claim 1.

16. The apparatus of claim 15, wherein the fluid source comprises a mixer adapted to mix first and second components of the fluid prior to the fluid being directed into the inlet of the tube.

17. The apparatus of claim 15, wherein the fluid comprises a seam sealing composition.

18. A method comprising:

connecting the nozzle of claim 1 to a fluid source;

directing a fluid from the fluid source into an inlet of the tube;

rotating the cap of the nozzle relative to the tube between a first orientation and a second orientation of the nozzle, wherein when the nozzle is in the first orientation the cap is rotated relative to the tube such that the outlet of the cap comprises a maximum open area, and wherein when the nozzle is in the second orientation the cap is rotated relative to the tube such that the first shield portion of the tube occludes a portion of the outlet of the cap such that the open area comprises a minimum open area; and ejecting the fluid through the outlet of the cap.

19. The nozzle of claim 1, wherein an open area of the aperture is greater than an open area of the outlet.

20. The nozzle of claim 1, wherein the first shield portion and second shield portion are rounded at the first end in the perpendicular direction from the tube axis.

21. The nozzle of claim 20, wherein the cap is dome-shaped at the first end of the cap and the first end of the first shield portion and the second shield portion follows the contour of the dome shape.

* * * * *